2,993,367
APPARATUS FOR SHEAR TESTING OF SOIL
Gordon F. A. Fletcher, Bronxville, N.Y., and Henry F. Le Mieux, Butler, N.J., assignors to Raymond International Inc., New York, N.Y., a corporation of New Jersey
Filed Dec. 19, 1958, Ser. No. 781,564
6 Claims. (Cl. 73—101)

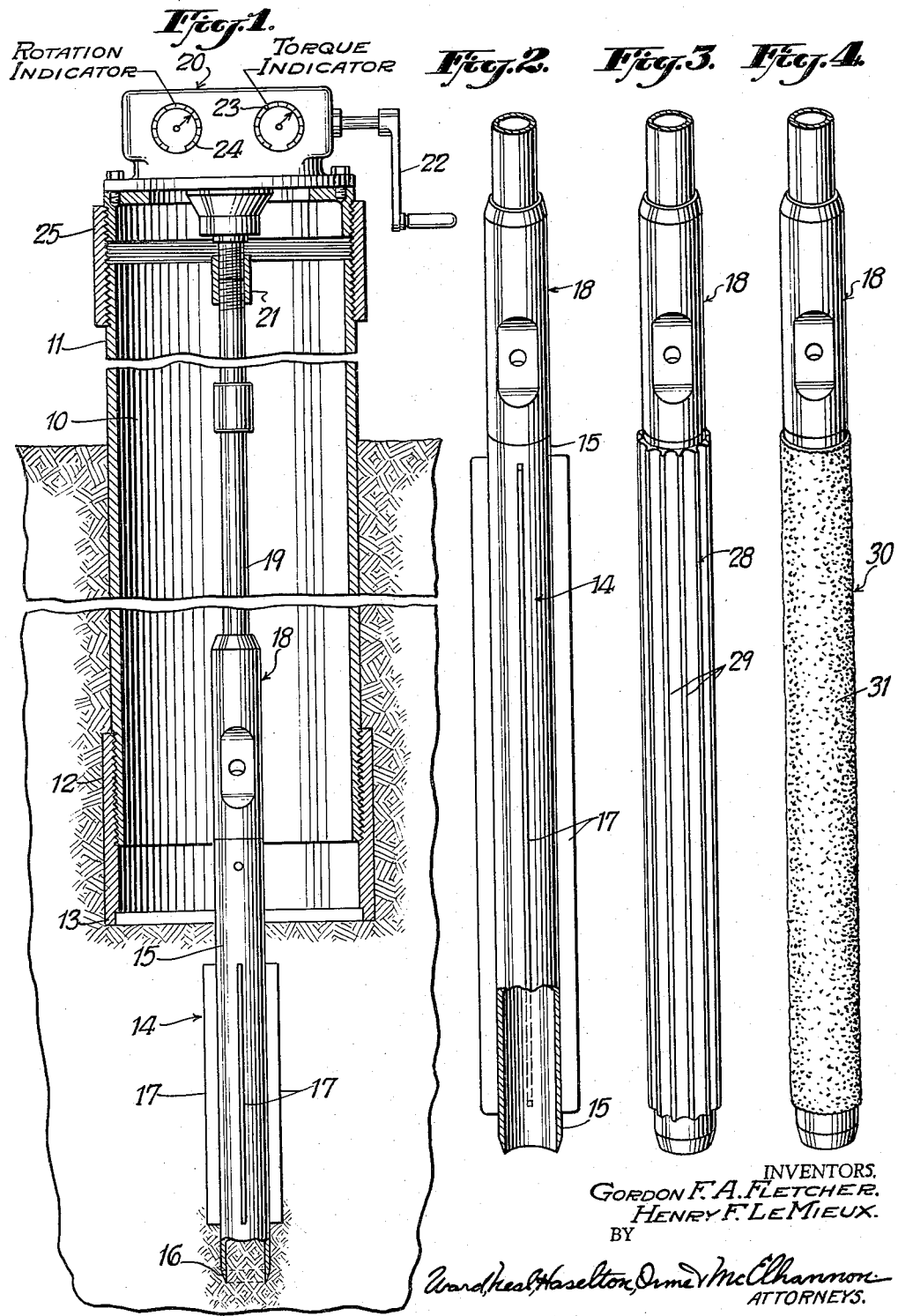

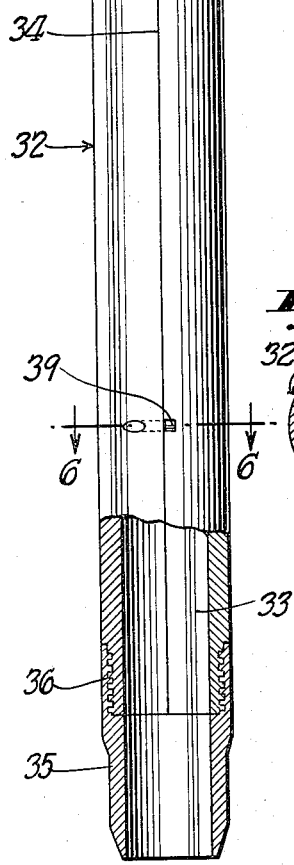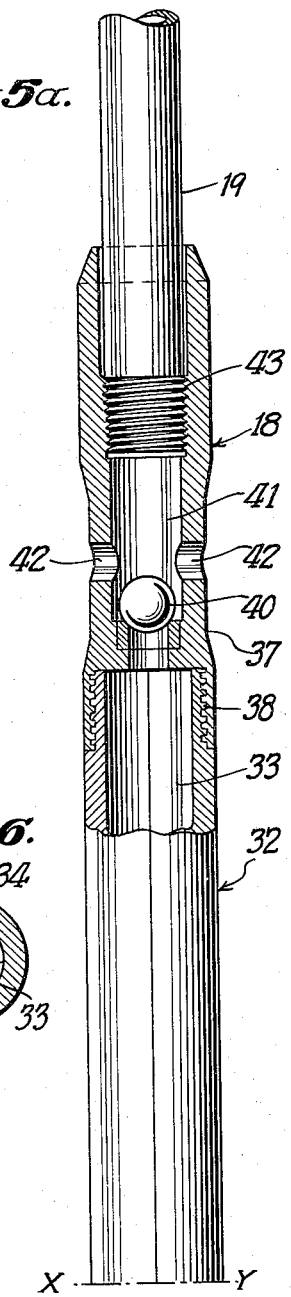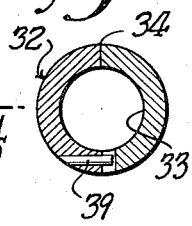

This invention relates to apparatus for determining the characteristics of soils and silts as they exist at particular locations in the earth. The invention is more particularly directed to testing the shearing strength of soils for purposes such as for determining the degree to which the soil will be able to support or retain in place piles, foundation structures and the like.

One method for testing soils for such purposes and which has often times been used, is to drive a so-called "spoon" or "sampler" into the earth at the particular depth and location where it is desired to secure a sample for test purposes, the sampler device, with the sample therein, thereafter being withdrawn, whereupon the sample is then taken to a laboratory for careful testing of its shear strength and other qualities. While with care, dependable results may be obtained with this method, yet it is usually rather inconvenient and often times difficult and expensive to carry the samples to the laboratory, keeping them meanwhile in undisturbed condition until finally tested, and the test results under some circumstances may lack some degree of reliability through lack of assurance that the samples and the methods used in testing, give the same results as if the sample material had been actually tested in situ before removal from the earth.

Another method of shear testing of soil which is advocated by some authorities and has had considerable use, is the so-called "vane method" for testing the soil in situ. Suitable methods and apparatus for carrying out this method and methods for calculating from the results given thereby the shearing strength of the soil are described in technical publication No. 193, 1957, of the American Society for Testing Materials, and entitled "Symposium on Vane Shear Testing of Soils." According to this method, a rod having at its lower end a plurality of radial and vertically extended vanes, is driven into the soil to a desired depth at the location where a test is to be made and the rod is thereupon rotated by applying to its upper end a suitable form of torque-indicating wrench means, so that as the rod bearing the vanes is rotated in the earth, the vanes will cause a substantially annular body of soil having a vertical axis, to be sheared with respect to the surrounding soil. By noting the torque initially required to accomplish such shearing and the torque subsequently required to turn the sample in situ in the earth through a predetermined angle and then stopping and later repeating such turning and torque measurements, the operator is able, by suitable calculations based on such torque measurements, to obtain values giving a fair measure of the shear strength of the soil. While this method avoids the necessity of removing successive samples from the earth and the time and trouble of taking them in undisturbed condition to a well-equipped laboratory for testing, yet this vane method does not afford any satisfactory opportunity for direct inspection of the samples, much less inspection of same in undisturbed condition, and hence, even if the torque readings show adequate strength, the soil still may embody some peculiar or unpredicted characteristics which will be overlooked, and which may possibly render it unsafe to carry the desired type or weight of foundation loads intended to be installed. Also, under some circumstances, in the opinion of some authorities, this vane method, if relied on alone, may give results which are not an appropriate measure of the shear strength of the soil prior to being disturbed, because the vanes which extend out radially from the vertical rod carrying same, will, upon starting to rotate, move and tend to compress the earth more rapidly at the outer portion of each vane than at regions closer to the rod, whereby the vanes bring about varying degrees of crushing forces against the soil, depending upon the radius at each particular point where the soil is engaged by the vane. Also, the crushing forces against the soil, on the advancing surfaces of the vanes, will differ widely from the forces of the soil on the rear or receding surfaces of the vanes as they are turned and this may give rise to unforeseeable results.

The present invention makes possible methods and forms of apparatus which combine certain of the features of the methods above referred to, while making it possible to avoid the principal shortcomings of those methods and yet retaining in large measure the general advantages of each.

In accordance with the present invention in its presently preferred form, a hollow sampler or "spoon" is provided with vanes, preferably a plurality thereof, secured to its exterior surface, and this device is driven into the earth to the location of the desired sample to be tested, whereby a sample of the earth at that point becomes lodged in the hollow space within the spoon or sampler, and then the device may be rotated by the use of suitable torque-indicating wrench means or the equivalent, as in the case of the vane method above referred to. The device may then be withdrawn from the earth and in the case of the initial sample thus taken at a given area, such sample may be taken to the laboratory and tested for its shear strength as in the case of the method first above referred to. The results of the laboratory test for this initial sample may then be compared with the shear strength determined from the torque readings obtained upon rotating the device as aforesaid while it was in the earth, and thus one may readily correlate or compare the results of the two types of tests. Thereafter the same device may be used by driving same into the earth at numerous other points in the general area of soil being investigated and by suitably turning the device with the torque-indicating wrench means at each of said locations. And if the torque indications are the same, or substantially the same, as obtained at the first location, this fact gives reasonable assurance that if actual samples at those succeeding locations were tested in the laboratory, they would give results substantially the same as obtained with the first sample tested. Also, each time when the device is withdrawn from a particular location, the sample therein may be visually inspected without taking it to the laboratory, and if it appears substantially the same as the first sample which was tested in the laboratory, then this will give further assurance that the soil will have the same shear strength at the various different spots successively tested, but without going to the time and expense of laboratory tests in all of these cases. On the other hand, if the torque indications at some of the successive points of testing in the soil region under examination, should prove to be substantially different from the readings obtained on the initial test, then, of course, a sample will be available for sending to the laboratory, whereby the laboratory test results may again be correlated with the results of the torque test obtained by rotating the vanes. In some cases it may be desirable in investigating the condition of a foundation area, to obtain and correlate the results of laboratory tests and vane tests from samples taken at several rather widely spaced points, and then when the vane and sampling device is driven into the earth at numerous intermediate points, the results may be compared with the correlations previously obtained, thus avoiding any necessity of further laboratory tests.

In accordance with alternative embodiments of the invention, the soil-testing device, instead of being provided with vanes, may have its exterior surface shaped with other forms of protuberances, so that when the device is rotated by torque-indicating wrench means or the like, the torque indications will give a measure of the shear strength which the soil would have with respect to some particular form of surface such as that of a corrugated pile shell. While for that particular purpose, corrugations may be formed on the testing device so as to extend vertically, as compared with the common forms of substantially horizontally extending corrugations on pile shells, yet the test results will afford a reasonably accurate measure of the shear strength which the soil would have when in engagement with an actual corrugated pile shell. Similarly, the test device may have its external surface shaped and formed to simulate the surfaces of a more or less roughened concrete pile shell, or even in other cases, the external surface of the testing devices may be cylindrical and smooth, so that when same are rotated with the torque-indicating wrench means, the indications will be a measure of the resistance which the soil at the point in question would present against movement of a smooth-surfaced pile shell or other object, when driven into position under pressure in the earth.

Various further and more specific objects, features and advantages of the invention will appear from the description given below, taken in connection with the accompanying drawings, illustrating by way of example preferred forms of the invention.

In the drawings:

FIG. 1 is an elevational view, largely in vertical section, showing a presently preferred example of the apparatus for practicing the invention and as positioned for use after installation at a point where the soil is to be tested;

FIG. 2 is an enlarged elevational view, partly in section, showing a sampling "spoon" with vanes thereon in the form shown in the lower part of FIG. 1;

FIGS. 3 and 4 are views similar to FIG. 2, but showing respectively other embodiments with the external surfaces corrugated and roughened for purposes of simulating respectively for test purposes, corrugated shells and concrete shells, or the like;

FIG. 5a shows the upper portion of a "spoon" sampler device and the manner in which same may be associated and connected with a supporting rod or pipe means therefor, this view being largely shown in section;

FIG. 5b is a view of the lower portion of the device of FIG. 5a; and

FIG. 6 is a sectional view taken along line 6—6 of FIG. 5b.

Referring now to the drawings in further detail, in practicing the invention, a hole, as indicated at 10 in FIG. 1, is formed in the earth to extend down to a depth shortly above the point where it is desired to examine or test the soil. This hole, which may be formed in any suitable well-known manner, preferably is provided with a casing, as at 11, the lower end of which, if desired, may be provided with a replaceable coupling-like member 12, threaded in place and formed with a relatively thin or beveled lower edge, as at 13, so that in the event the casing is to be driven or partially inserted by driving, the edge 13 will easily penetrate the earth.

A shear vane test "spoon," which forms an essential part of the invention of the embodiment shown in FIG. 1, is indicated at 14. This comprises a central hollow shaft or cylinder 15, preferably sharpened at its lower end, as indicated at 16, and provided along its sides with a plurality of radially extending vanes, as indicated at 17, four of such vanes being provided in the example shown, these being spaced 90° apart on the walls of the tube 15 and secured in place as by welding. In a typical case, the tube 15 may be, for example, about two inches in diameter, whereas the overall diameter of the device, including the vanes, may, for example, be about 3¼ inches and the vanes may extend vertically for a distance of about 14 inches, although under some circumstances various different dimensions may be preferred. The device 17 is joined at its upper end, as at 18, by connection means for example, such as described hereinafter in connection with FIG. 5a, to a supporting pipe or rod 19, which in turn extends up through the casing 11 to a point well above ground. The rod or pipe 19, as indicated, may be formed of a number of coupled sections, the number and length thereof being variable depending upon the depth at which the soil to be tested and the depth to which the casing 11 has been extended. The casing 11 may also, if desired, be formed of several coupled sections depending upon such depth.

In using the arrangement of FIG. 1, after the hole 10 has been made and the casing 11 is in place, the vane test spoon 14 is introduced and supported by the pipe or rod 19, and, by applying impacts to the upper end of such supporting rod, the device 14 is driven into previously undisturbed earth below the hole 11 to the depth where a soil sample is to be tested. This will cause a sample of the soil to be received within the hollow interior of the "spoon" or tube portion 15.

Thereupon suitable torque-indicating wrench means is applied to the upper end of the supporting tube or rod 19. As here somewhat schematically shown in FIG. 1, this may comprise a gear box 20 detachably coupled as at 21 to the upper end of the supporting rod or tube 12 and suitably connected to the gearing therein to be turned by a crank handle 22. The gearing should be such that upon rotating this handle, an indicator, as at 23, calibrated to indicate the torque in foot pounds, suitably associated with the gearing, will indicate the torque which is being applied at any moment to rotate the assembly 19, 15, 14. At the same time, another indicator in the form of a protractor or rotation indicator 24, is provided and suitably connected to the gearing to indicate at any time the angle through which such test assembly has been rotated.

The gear box 20 may be suitably detachably mounted at the top of the casing by coupling means, as at 25, and it will be understood that this gear box arrangement is herein shown merely schematically for clearness and that the indicators need not necessarily be on a side thereof, but may be elsewhere thereon. One possible example of such a rotating and torque-indicating arrangement is described and illustrated at pages 9–11 in the above-mentioned text on the vane shear testing of soils.

In a typical case in practicing the present invention, the operator, upon turning the crank 22, will first note the initial maximum torque indication and will then continue to turn the handle so as to rotate the assembly 19, 15, 14 at a rate of say about 6° per minute through one complete revolution. Then, after four or five minutes, such rotation may be repeated to obtain indications of the generally lower so-called "remolded strength" of the clay. With these torque readings, as will be apparent from the above-mentioned treatise, one may calculate the shearing strength of the soil or clay against which the vanes 17 impinge during the rotation, and also the so-called "ratio of sensitivity" of the clay. It will be understood that upon turning the assembly 19, 15, 14, the vane 17 will in effect dislodge in the earth a hollow, substantially cylindrical sample divided into four parts by four vanes and rotate such sample in a shearing relation to the surrounding earth. While the motion of the particles will be in a horizontal direction, it will give a measure of the shearing strength which the soil would have in vertical directions when used to support a foundation or pile.

After taking the torque readings above described, the device 17 is withdrawn from the earth and the soil sample contained within the tube 15 may then be removed and subjected to visual inspection and laboratory tests to determine its shearing strength and other characteristics as per well-known methods of laboratory examination and calculation used heretofore for testing samples from sampling spoons.

Thereupon the shearing strength then determined and calculated in the laboratory may be compared with the results obtaijned from the vane shear test above referred to and thus the results from the two methods may be used, one to check the accuracy of the other and, if the results do not agree, then at least the results may be correlated and a ratio between same obtained.

After taking the initial torque readings above described, the device 14 can either be withdrawn from the soil and inserted at another point where the soil is to be tested, or else driven down further into the soil for a test at a lower level. And if the torque readings from such subsequent tests are substantially the same as those obtained in the initial test as checked in the laboratory, then the operator may be reasonably well assured that, if laboratory tests of samples from the subsequent samplings were made, the results would be the same as obtained from the initial sample. Or, if the torque readings on the subsequent samplings are substantially different than obtained on the original test, then laboratory tests may be made on one or more of the subsequent samplings to determine the correlation of the vane tests and the laboratory tests therefor (if in fact the results from the two types of tests are not substantially the same). In any event, as each subsequent test is made and the device 17 withdrawn from the earth, the sample contained therein may be visually examined without sending it to the laboratory and if such visual examination reveals some unusual condition, the laboratory tests may, of course, follow. But, in the usual investigation of the soil for a building site, it will be necessary or desirable to supplement the vane tests by laboratory tests of withdrawn samples only in one or possibly a very few typical instances of samples taken at various spaced locations in the area. Thus the time and expense of numerous laboratory tests and any uncertainties arising from disturbance of the samples in taking them from the ground to the laboratory will be avoided and yet the results of the vane tests at each particular spot tested will give tests which can be dependably relied upon, particularly upon considering the correlation of the two types of initial tests and the ratio therebetween, or the correlation of the two types of tests at a relatively few widely spaced points.

As above indicated, FIG. 2 is an enlarged view of the device 14 of FIG. 1 and FIG. 3 shows a similar device 28, except that its exterior surface, instead of being provided with vanes, is formed with vertical corrugations 29 to provide a surface corresponding to that for example of corrugated pile shells as hereinabove mentioned. FIG. 4 shows another embodiment 30 corresponding to the one shown at 14, except that here the external surface of the device is roughened to simulate for example a surface of concrete, such as of a concrete pile. Such a surface may, for example, be of metal which has been cast to conform to the irregularities of an actual surface of concrete, or the roughened surface, as shown at 31, may comprise a layer of actual concrete, reinforced if desired, as applied to the device 30. It will be appreciated that the device may be provided with surface formations other than the examples shown in FIGS. 2, 3 and 4, to simulate various types of surfaces, such as parts of foundations, piles or caissons, which are to bear either frictionally therealong, or in a direction normal to the adjacent surface of the soil at the region or points where the shear strength tests are made. The devices of FIGS. 3 and 4 may be used in a manner similar to that described above in connection with the device 14.

In FIGS. 5a and 5b, another form of sampler spoon is shown at 32, having a smooth outer surface and containing an internal space 33 for forming a cavity or chamber to receive a sample of the soil to be tested, as in the case of the cavity within the device 14 as above described. As shown in FIGS. 5a and 5b, the sampler device may comprise an elongated cylinder formed of two parts, separable along a longitudinal median line as indicated at 34 (FIGS. 5a, 5b and 6), these two parts being secured together by means of a removable hollow point member 35, having threaded engagement as at 36 with the lower end of the spoon. The parts of the upper end of the spoon may similarly be held together by a portion of member 37 having threaded engagement as at 38 with the spoon. Pin means as at 39 may be provided normally to hold the parts of the spoon in register before or after the upper and lower ends are held in place by the threaded members 35 and 37. By making the spoon separable into two parts in this way, after a sample has been lodged therein and the spoon is withdrawn from the earth, one half may be readily separated from the other, leaving the other half as a cradle or channel-shaped member supporting the sample in undisturbed condition, ready for testing; or the sample may be transferred to suitable carrying means for taking same to the laboratory. It will be understood that the members 17 and members 14, 28 and 30, if desired, may also be similarly made of two parts and retained together when driven into the earth in the same manner as the member 32.

When the spoon is lowered and driven into the earth, the air contained therein, as well as any water or loose flowing mud, should have an opportunity to escape from the upper end to allow the sample to protrude up into the spoon without undue disturbance. For this purpose, as shown in FIG. 5a, the fixture 18 may contain a ball valve as indicated at 40, permitting fluid, gas or liquid to escape up into a chamber 41, and thence out through apertures at 42. The upper end of the fixture 18 may have detachably threaded engagement, as at 43, with the supporting pipe or rod 19. It will be understood that the ball valve arrangement and the fixture containing same, as shown in FIG. 5a, may also be used as indicated at 18 in the examples of FIGS. 1–4 inclusive. Also, all of the examples as shown in FIGS. 2–5 inclusive, are designed to be rotated after being driven into the earth by means the same or similar to that discussed above in connection with FIG. 1. And in the case of the smooth-surfaced sampler tube or spoon 32, such rotation of same while said surface is engaging under pressure the soil at the point to be tested, will cause torque indications to be given simulating those which would occur for example when a smooth walled pipe shell frictionally engages such soil under pressure, and the torque indications may be used to calculate, or estimate, or determine by trial or experience, the degree to which the soil under test and under pressure in situ will be able to withstand engagement with a surface of such a pile shell or casing or other foundation portion. And as in the case of the operation of the vane type of FIG. 1, in the testing of initial samples, one may obtain samples from the chamber or cavity 33 after withdrawal of the device, and test these in the laboratory and correlate the results with the results of the torque tests made by rotating the spoon 32 and then for subsequent samplings in the region, if the torque tests are substantially the same, then the samples taken during such subsequent samplings may be visually inspected, but need not all be taken to the laboratory for tests. Generally it will suffice to make laboratory tests of only one or a few typical samples and to rely upon the results of the torque tests for intervening samplings. That is, by those methods, one may determine the pattern as to the relationships of the shear strengths (as well as other factors) as actually measured on the removed samples, as compared with the values of the torque indications, so that for further samplings, torque indications can be used to estimate approximately what the results would be of testing the removed samples without necessarily going to the trouble of sending each removed sample to the laboratory for tests.

When the devices as per FIGS. 1-4 inclusive are turned and the resulting torque indications are determined, it will be understood that such indications will give a "measure of the shear strength" of the earth surrounding the sampler spoon devices (which measure may be by calculations translated into values of "shear strength") and whether the protrusions on the sampler spoon means as turned are in the form of vanes, ribs, corrugations or roughened areas. In using devices such as of FIGS. 4, 5a and 5b also if the surrounding soil is such that it tends to adhere to the surfaces of these devices more effectively than the soil particles adjacent thereto will adhere to each other, then the torque indications will afford a measure of the shear strength. And if the surrounding soil masses tend to adhere to each other more effectively than to the surfaces of the sampler spoon means, then the torque indications will give a measure of the skin friction which like surfaces of foundation elements would have with respect to the soil; that is, the torque readings will indicate the capabilities of the soil in resisting movement of any foundation element having a similar surface when engaging the soil in situ under the existing pressure.

It will be apparent that all of the embodiments of the invention have the advantage of making possible two types of tests of the soil during each single instance that the sampler spoon means is inserted in and removed from the soil. That is, the chamber or sample receiving cavity makes it possible to remove in relatively undisturbed condition, a sample for inspection and later laboratory testing, if desired, and at the same time, the turning of the sampler spoon means and the measuring of the required torque, in a quite different way enables determination of the capabilities of the soil to resist movements of a foundation element therein. Since in the usual case, the sampling has to be done at comparatively great depths, this possibility of accomplishing two types of tests for each single driving of the apparatus, makes possible important savings of time and expense, as well as enabling correlation and checking of the results of the two types of tests, with assurance that it is the same soil at substantially the same spot which is being tested by the two types of tests.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for testing the characteristics of soils to determine their capabilities for resisting movement of a foundation element when engaging the soil, such apparatus comprising in combination: sampler spoon means containing an internal cavity adapted to receive a soil sample when the spoon means is driven into the earth at the location of a desired sample; an extensive supporting shaft means by which said sampler spoon means may be driven to a substantial depth in the earth and later withdrawn with such a sample therein to be tested; means operatively connected to the upper portion of said shaft for turning same, thereby to rotate the spoon means in the earth; and means operatively connected to the turning means for indicating the torque required to effect such turning, thereby to provide a measure of such resistance to movement provided by the soil under pressure in situ at the same location where the withdrawn sample is taken.

2. Apparatus for testing the characteristics of soils to determine their capabilities for resisting movement of a predetermined foundation element when engaging the soil, such apparatus comprising in combination: sampler spoon means containing an internal cavity adapted to receive a soil sample when the spoon means is driven into the earth at the location of a desired sample, the exterior surfaces of said spoon means being formed to simulate the surface of such predetermined foundation element; an extensive supporting shaft means by which said sampler spoon means may be driven to a substantial depth in the earth and later withdrawn with such a sample therein to be tested; means operatively connected to the upper portion of said shaft for turning same, thereby to rotate the spoon means in the earth to cause said protrusions to shearingly engage the soil; and means operatively connected to the latter means for indicating the torque required to effect such turning, thereby to provide a measure of such resistance to movement provided by the soil under pressure in situ at the same location where the withdrawn sample is taken.

3. Apparatus in accordance with the foregoing claim 2 and in which said protrusions are of a form to simulate corrugations.

4. Apparatus in accordance with the foregoing claim 2 and in which said protrusions are of a form to simulate a concrete surface.

5. Apparatus for testing the characteristics of soils to determine their capabilities for resisting movement of a foundation element when engaging the soil, such apparatus comprising in combination: sampler spoon means containing an internal cavity adapted to receive a soil sample when the spoon means is driven into the earth at the location of a desired sample, the exterior surface of said spoon means being provided with longitudinally extending vane means thereon; an extensive supporting shaft means by which said sampler spoon means may be driven to a substantial depth in the earth and later withdrawn with such a sample therein to be tested; means operatively connected to the upper portion of said shaft for turning same, thereby to rotate the spoon means in the earth and cause said vane means to shear portions of the adjacent soil from the surrounding soil; and means operatively connected to the turning means for indicating the torque required to effect such turning, thereby to provide a measure of the shear strength of the soil in situ at the same location where the withdrawn test sample is taken.

6. Apparatus for testing the characteristics of soils to determine their capabilities for resisting movement of a foundation element when engaging the soil, such apparatus comprising in combination: sampler spoon means containing an internal cavity adapted to receive a soil sample when the spoon means is driven into the earth at the location of a desired sample; an extensive supporting shaft means by which said sampler spoon means may be driven a substantial depth in the earth and later withdrawn with such a sample therein to be tested; connecting means joining said supporting shaft and said spoon means, said connecting means including valved passage means opening into said spoon means for permitting the escape therefrom of loose flowing material, means operatively connected to the upper portion of said shaft for turning same, thereby to rotate the spoon means in the earth; and means operatively connected to the turning means for indicating the torque required to effect such turning, thereby to provide a measure of such resistance to movement provided by the soil under pressure in situ at the same location where the withdrawn sample is taken.

References Cited in the file of this patent

UNITED STATES PATENTS

| 1,109,446 | Melberg | Sept. 1, 1914 |
| 2,316,024 | Sewell | Apr. 6, 1943 |
| 2,603,967 | Carlson | July 22, 1952 |
| 2,709,363 | Lea | May 31, 1955 |
| 2,775,889 | Decker | Jan. 1, 1957 |